United States Patent Office 3,621,519
Patented Nov. 23, 1971

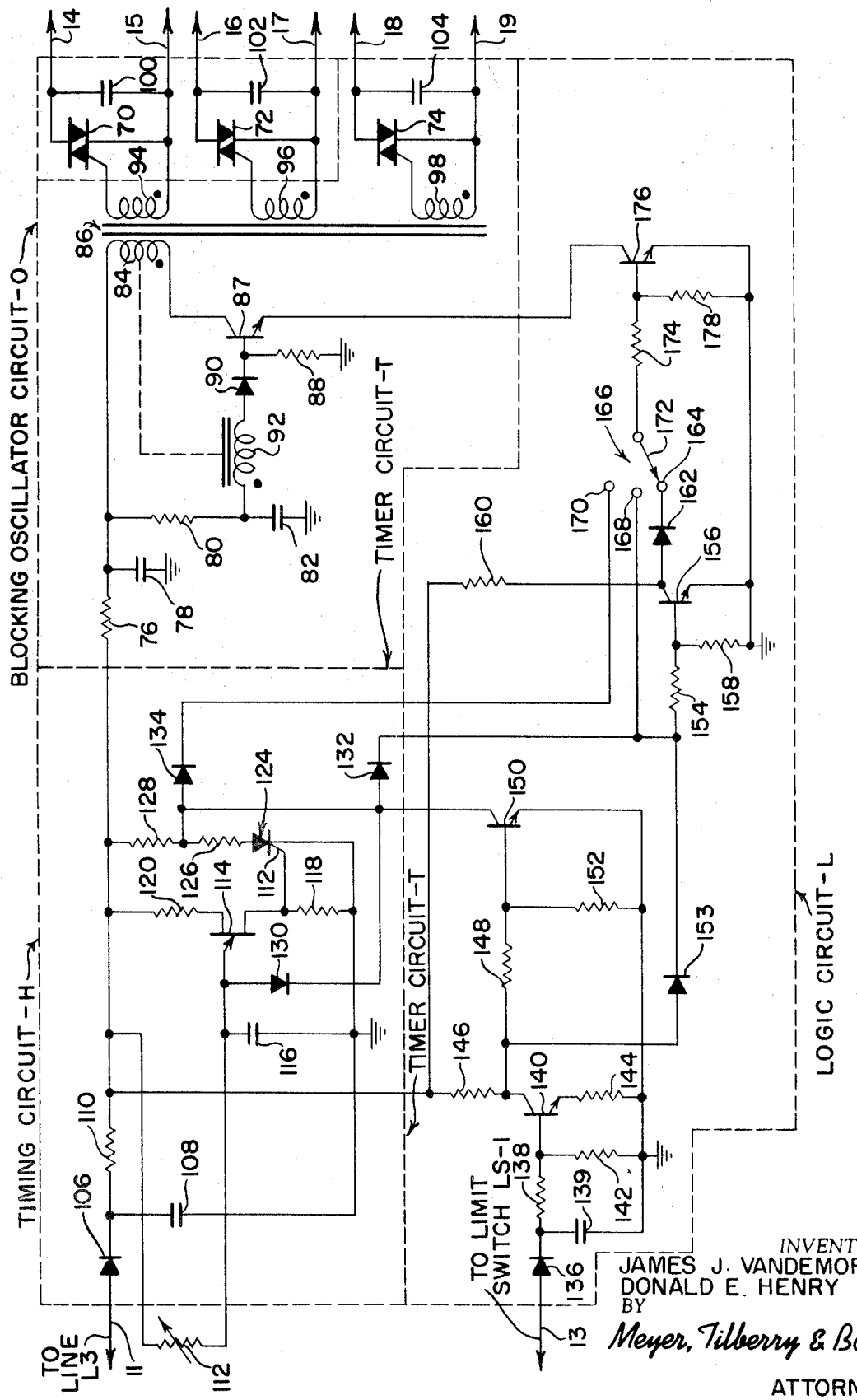

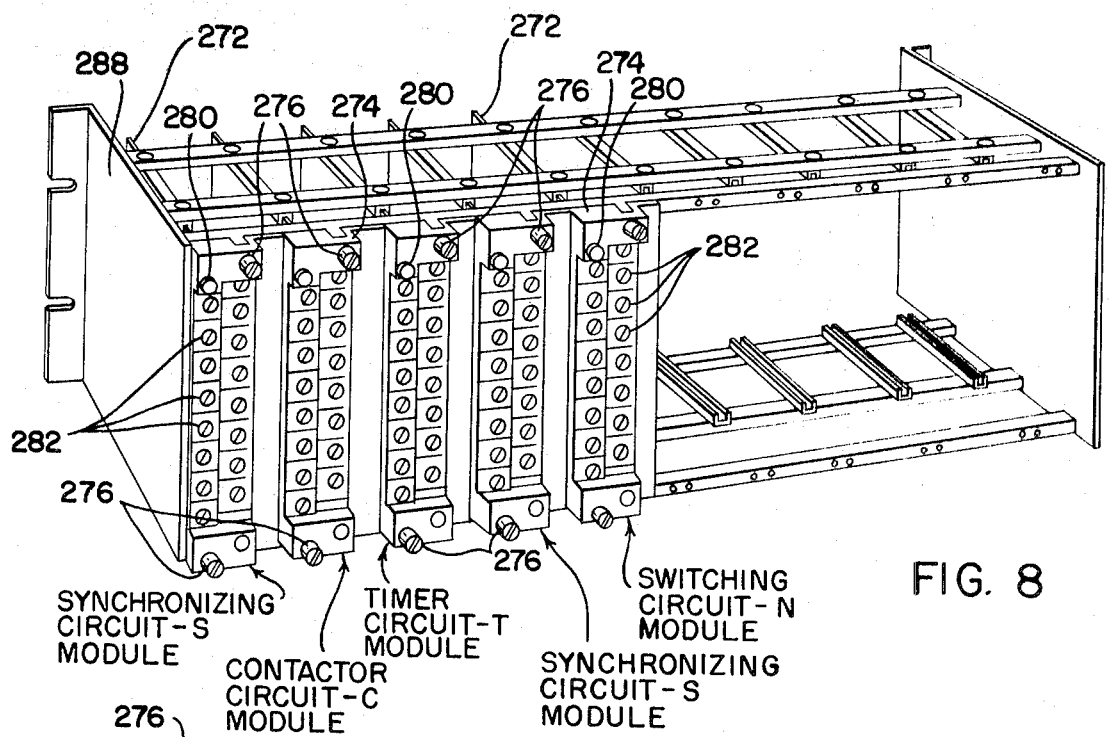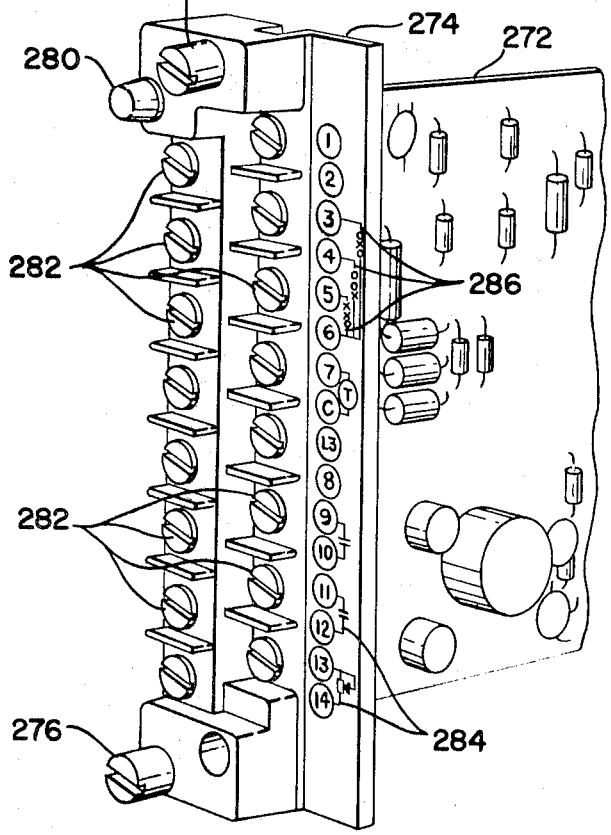

3,621,519
SOLID-STATE PROCESS CONTROL SYSTEM
James J. Vandemore, Geneseo, Ill., and Donald E. Henry, Davenport, Iowa, assignors to E. W. Bliss Company, Canton, Ohio
Filed Sept. 26, 1968, Ser. No. 812,486
(Filed under Rule 47(b) and 35 U.S.C. 118)
Int. Cl. B29c 3/06
U.S. Cl. 18—2
15 Claims

ABSTRACT OF THE DISCLOSURE

There is provided a process control system including a plurality of functional modules for sequencing a plurality of operations of a machine, such as a plastic molding machine, wherein the functional modules include a static electrical control circuit. The static control circuit is comprised of an input circuit for receiving alternating-current signals; static direct-current logic means for performing an electrical function and then providing a direct-current output signal; static direct current to alternating current converter means, such as a triac switching circuit, coupled to the logic means for providing an alternating-current output signal from the direct-current signal; and, actuatable means such as a solenoid controlled valve, coupled to the converter means, for upon energization, providing at least one of the plurality of machine operations.

DISCLOSURE

The present invention pertains to the art of control systems and, more particularly, to a process control system for controlling the operation of a machine.

The invention is particularly applicable in conjunction with machines for molding of thermoplastic material and will be described with particular reference thereto although it will be appreciated that the invention has broader applications such as a control system for sequencing a plurality of machine operations.

Machines for injection molding of thermoplastic material generally include a fixed die member, a movable die member, actuation means, such as a solenoid-controlled valve system, for driving the movable die member, plastic injection system and electrical control circuitry for controlling the operation of the machine.

As is well known in the art of injection molding, upon closure of the movable die member with respect to the fixed die member, heated thermosetting plastic is injected through the fixed die member until the cavity formed between the die members is completely filled with plastic. After the injected plastic is allowed to cool and solidify the movable die member is withdrawn, and the molded plastic article is removed.

Injection molding machines known heretofore, such as the machine illustrated in the United States patent to B. D. Ashbaugh 2,680,883, have generally included electrical control circuitry comprised of electromechanical switches, relays, and timers. Since injection molding machines operate at a very high velocity i.e. a complete cycle requires approximately two-tenths of a second, the electromechanical devices have a relatively short life expectancy. Further, the machine must be stopped prior to replacement of a single electromechanical device, and the production loss during the period of time the machine is being repaired might well exceed two hundred dollars a minute. Another problem associated with electromechanical circuitry is that because of machine vibrations, the circuits could not be mounted directly on the machine.

Because of the advantages of solid-state control circuits, several of the leading manufacturers of plastic molding machines have been considering the idea of converting the control system from an electromechanical circuit to a solid-state circuit. To convert the control system from an electromechanical circuit to a solid-state circuit created a serious problem since the control system of almost every molding machine was substantially a different circuit. The fact that almost every molding machine was designed for a different purpose, i.e., different operations or options were required, presented only a minor problem when the control systems included electromechanical circuitry. Each manufacturer employed several technicians familiar with electromechanical circuitry, such as relays, timers, and switches, to custom design for each molding machine a particular control circuit. These technicians became very skilled at applying electromechanical circuitry to control plastic molding machines often times having as many as thirty different functions or options. Some began building solid-state logic circuits which could be employed with a plastic molding machine; however, the technician skilled in applying complicated electromechanical circuitry was frequently unable to combine the more sophisticated solid-state logic circuits to provide a control system. This presented a problem for the molding machine manufacturers, to wit, either electronic engineers with training in solid-state engineering must be hired at great expense and trained as to the operation of plastic molding machines, or the technician with a knowledge of molding machine operation must be trained to apply the more sophisticated solid-state logic circuitry.

The present invention proposes that the problem could be solved in an alternative manner. Solid-state logic circuits could be mounted in modules each providing a specific function equivalent to a corresponding electromechanical function and that function could be denoted on the input and output terminals of the module in the form of electromechanical symbology similar to that employed by technicians in designing electromechanical circuits. In other words, the actual solid-state circuit within the module would include the more sophisticated solid-state logic circuitry; however, a person connecting the module into a control circuit would think in terms of the electromechanical symbology shown on the outer face of the module. With this approach the technician skilled in applying electromechanical circuitry to a plastic molding machine could apply the most elaborate solid-state timers, solid-state switching circuits, and solid-state logic circuits without special training in the field of solid-state electronics. Obviously, if repair of the control circuit becomes necessary, the same technician could make the necessary repairs without any special knowledge of solid-state electronics.

In applying solid-state electronic circuitry to plastic molding machines, it is desirable to eliminate the electromechanical load relays as well as the basic electromechanical logic relays. Since the hydraulic valves of plastic molding machines are controlled by high current, alternating-current solenoids, it is desirable to employ a solid-state device capable of switching high current, alternating-current loads. A triac is proposed by one aspect of the present invention to switch the solenoids; however, because of the high current requirements and transient voltages that may be encountered during switching, the current and voltage ratings of the triacs may be exceeded and destruction of the device may occur.

The present invention is directed toward an improved process control system for sequencing a plurality of machine operations, such as a plastic molding machine, wherein the control circuitry includes static elements mounted in functional modules, thereby improving the circuit reliability and speed of operation, and, providing functional modules which may be simply combined to provide a process control system having the desired functions or operations.

The present invention contemplates a new and improved process control system as well as functional modules adapted to constitute a process control system and which overcome the above referred-to problems, and others, and which are relatively simple in design.

In accordance with one aspect of the present invention there is provided a process control system including a plurality of functional modules for sequencing a plurality of machine operations wherein at least one of the functional modules includes a static electrical control circuit. The static control circuit includes an input circuit means for receiving input alternating-current signals; static direct-current logic means coupled to the input circuit means for performing an electrical function and then providing a direct current output signal; static direct current to alternating current converter means coupled to the logic means for providing an alternating current output signal from the direct-current output signal; and, actuatable means coupled to the converter means, for upon energization, controlling at least one of the plurality of machine operations in dependence upon the function performed by the static direct-current logic means.

In accordance with a more limited aspect of the present invention, the static direct current to alternating current converter means includes a triac control device.

The present invention, in one of its aspects, also contemplates the provision of an injection apparatus for molding articles of thermoplastic material comprising a frame, a first and second crosshead member mounted for sliding movement on the frame; an injection means mounted on the first crosshead immediate the first crosshead and the second crosshead, for upon actuation, injecting plastic material. The injection apparatus also includes a first die part mounted for sliding movement on the frame; a second die part fixed to the second crosshead; and hydraulic actuation means for driving the first die part from an open position to a closed position. In accordance with this aspect, the present invention comprises: actuatable switch means adapted to be connected to an alternating-voltage source for providing an output signal in dependence upon the position of the first die part; and, a control circuit including an input circuit coupled to the actuatable switch means; alternating current to direct current converter means coupled to the input circuit means for providing a direct current input signal from the input alternating current signal, static direct-current logic means for preforming an electrical function and then providing a direct current output signal; static direct current to alternating current converter means coupled to the logic means for providing an alternating current output signal for energizing the hydraulic actuation means in dependence upon the function performed by the static direct-current logic means.

In accordance with a still more limited aspect of the present invention, there is provided a functional module comprised of a printed circuit board having an electrical control circuit mounted thereon wherein the control circuit includes an input circuit means for receiving input an alternating current signal and an output circuit means for carrying an output alternating current signal; alternating current to direct current converter means coupled to the input circuit means for providing a direct current input signal from the input alternating current signal; static direct-current logic means coupled to the input circuit means for performing an electrical function and then providing a direct current output signal; static direct current to alternating current converter means coupled to the static logic means for providing an alternating current output signal from the direct current output signal; and, a terminal board associated with the printed circuit board, wherein the board has indicia means thereon for providing a visual indication of an electromechanical circuit which performs a function analogous to the function actually performed by the static direct current logic means.

In accordance with another aspect of the present invention, there is provided a method of controlling the operations of a plastic molding machine wherein at least one of the operations is the positioning of a movable machine member, comprising the steps of: providing a plurality of solid-state functional modules each controlling at least one of the machine operations and including an input circuit means for receiving an input signal, solid-state logic circuit means for performing an electrical function and providing a direct-current output signal, and solid-state direct current to alternating current converter means for providing an alternating curent output signal in response to receipt of a direct current output signal; mounting the functional modules in a cabinet substantially adjacent to each other; providing at least one circuit means for developing a signal in response to the position of the movable machine member; coupling at least one of the functional modules to the signal developing circuit means; and, providing at least one actuatable means, for, upon receipt of an alternating-current output signal driving the movable machine member.

In accordance with a still further aspect of the present invention, there is provided a method of constructing a solid-state control circuit comprising the steps of: providing a face member having a plurality of electrical terminals; applying to the face an electromechanical schematic diagram schematically associating some of the terminals with a schematically illustrated electromechanical functional means which, when energized, performs an electromechanical function; and, electrically connecting the terminals with a solid-state circuit which, when energized, performs an electrical function substantially analogous to the electromechanical function of the schematically represented electromechanical functional means.

In accordance with a still more limited aspect of the present invention, at least some of the electrical terminals of a plurality of the solid-state control circuits are connected together to control a plurality of machine operations.

The primary object of the present invention is to provide a solid-state process control system as well as functional modules therefor for sequencing a plurality of machine operations.

Another object of the present invention is to provide a process control system and functional modules therefor in which the input signal takes the form of an alternating-current signal, the logic means performs logic functions on a direct-current signal, and the output signal takes the form of an alternating-current signal.

Another object of the present invention is to provide a method of connecting solid-state logic control circuits by connecting terminals associated with an electromechanical schematic diagram which schematically illustrates an electromechanical function being substantially analogous to a function performed by the solid-state logic control circuit.

Another object of the present invention is to provide a process control system and functional modules in which switching of the actuatable means, such as a solenoid, controlled valve, occurs at a time when the alternating-current line voltage is at approximately a zero voltage level.

Another object of the present invention is to provide a process control system and functional modules in which the switching circuits, logic circuits, timing circuits, synchronizing circuits and power switching circuits include solid state devices, i.e., no electromechanical devices such as relays or timers are employed.

Another object of the present invention is to provide a process control system in which the control circuit has improved reliability, high speed operation, and simplified circuit design.

A further object of the present invention is to provide a process control system in which the logic, timing and power switching circuits are in modular form so that functional modules may be combined to provide the desired functions or operations.

A further object of the present invention is to provide a solid-state process control system having functional circuits mounted in modular form with electromechanical symbology printed on the terminal board portion so that a person familiar with electromechanical symbology may combine the solid-state modules to provide the desired machine functions.

A further object of the present invention is to provide a process control system in which a triac is employed in the output circuit for switching an alternating-current supply source across an actuatable means, such as a solenoid controlled valve.

These and other objects and advantages of the invention will become apparent from the following description of the preferred embodiemnt of the invention as read in connection with the accompanying drawings in which.

Figure 1:
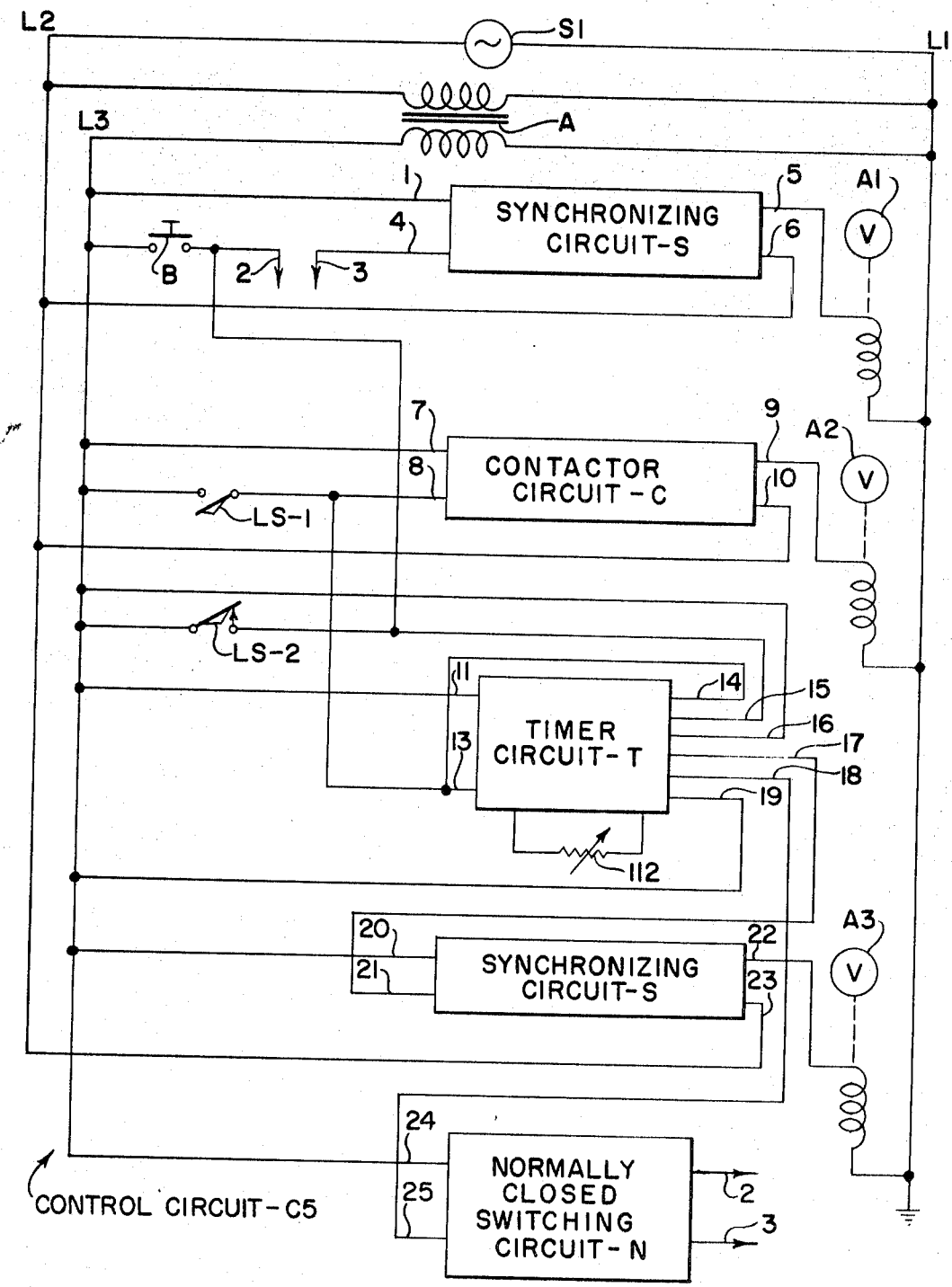
FIG. 1 is a schematic circuit diagram illustrating a process control circuit in accordance with the preferred embodiment of the present invention.

FIGS. 3 through 6 are schematic circuit diagrams illustrating the preferred embodiments of a timing circuit, normally-closed switching circuit, contactor circuit, and synchronizing circuit, respectively, which are preferably employed with the process control circuit as illustrated in FIG. 1; and, FIGS. 7 and 8 generally illustrate a functional module and mounting arrangement therefor for applying circuits such as those illustrated in FIGS. 3 through 6. Certain features disclosed herein but not claimed are claimed in the copending divisional application, Ser. No. 121,110, filed Mar. 14, 1971.

Referring now to the drawings wherein the showings are for purposes of illustrating a preferred embodiment of the invention, and not for purposes of limiting same, FIG. 1 illustrates a control circuit C5, and generally comprises an alternating-voltage supply source S1, coupled through a transformer A to a synchronizing circuit S, contactor circuit C, timer circuit T, synchronizing circuit S, and normally-closed switching circuit N, which are in turn coupled to a set of actuatable solenoids A1 through A3.

CONTROL CIRCUIT

Reference is made to FIG. 1 which illustrates the preferred embodiment of control circuit C5, which is preferably connected to a 115 volt alternating-voltage supply source S1 having one terminal connected to a line L1, and the other terminal connected to a line L2, and a transformer A having a primary winding connected across lines L1 and L2, and a secondary winding connected between line L1 and a line L3. Transformer A preferably has a primary-to-secondary turn ratio to provide an output voltage of 24 volts when the input terminals are connected across the 115 volt supply source S1. Line L1 is connected directly to ground. Line L3 is connected directly to one of the input terminals of a synchronizing circuit S, and is also connected through a normally-open switch B to an output terminal 2 of a normally-closed switching circuit N. The other output terminal 3 of switching circuit N is connected directly to the other input terminal 4 of synchronizing circuit S. One of the output terminals 5 of synchronizing circuit S is connected through a coil of solenoid controlled valve A1 to line L1, and the other output terminal 6 is connected directly to line L2. Synchronizing circuit S, preferably takes the form of the circuit disclosed in United States patent application Ser. No. 812,489, entitled Synchronizing Network, and filed on Sept. 27, 1968.

Line L3 is also connected directly to one of the input terminals 7 of the contactor circuit C, and the other input terminal 8 thereof is connected through a normally-open limit switch LS-1 to line L3. One of the output terminals 9 of contactor circuit C is connected through a driving coil of solenoid control valve A2 to line L1, and the other output terminal 10 is connected directly to line L2. Contactor circuit C preferably takes the form of the circuit disclosed in United States patent application Ser. No. 730,212, entitled High Temperature Semi-Conductor Switching Circuit, and filed on Apr. 16, 1968.

Line L3 is also connected directly to one of the input terminals 11 of a timer circuit T. The other input terminal 13 of timer circuit T is connected through limit switch LS-1 to line L3, and is also connected directly to an output terminal 14 of timer circuit T. Line L3 is connected through a normally-closed limit switch LS-2 to output terminal 15 of timer circuit T and is also connected directly to output terminals 16 and 19 of timer circuit T. Output terminal 15 of timer circuit T is also connected to output terminal 2 of switching circuit N. Timer circuit T preferably takes the form of the circuit disclosed in United States patent application Ser. No. 812,487, entitled Solid-State Time-Delay Switching Circuit, and filed on Sept 27, 1968.

Line 3 is also connected to one of the terminals 20 of a second synchronizing circuit S, and the other input terminal 21 thereof is connected to an output terminal 17 of timer circuit T. One of the output terminals 22 of the second synchronizing circuit S is connected through the driving coil of a solenoid controlled valve A3 to line L1, and the other output terminal 23 is connected directly to line L2. Solenoid operated valves A1 through A3 preferably take the form of valves for controlling the flow of hydraulic fluid to thereby drive movable machine members; however, it is readily apparent that other actuatable means, such as electric motors having gear arrangements for carrying out machine operations, could be substituted therefor.

Line L3 is also connected to one of the input terminals 24 of normally-closed switch circuit N, and the other input terminal 25 thereof is connected to output terminal 18 of timer circuit T.

INJECTION MOLDING MACHINE

Figure 2:
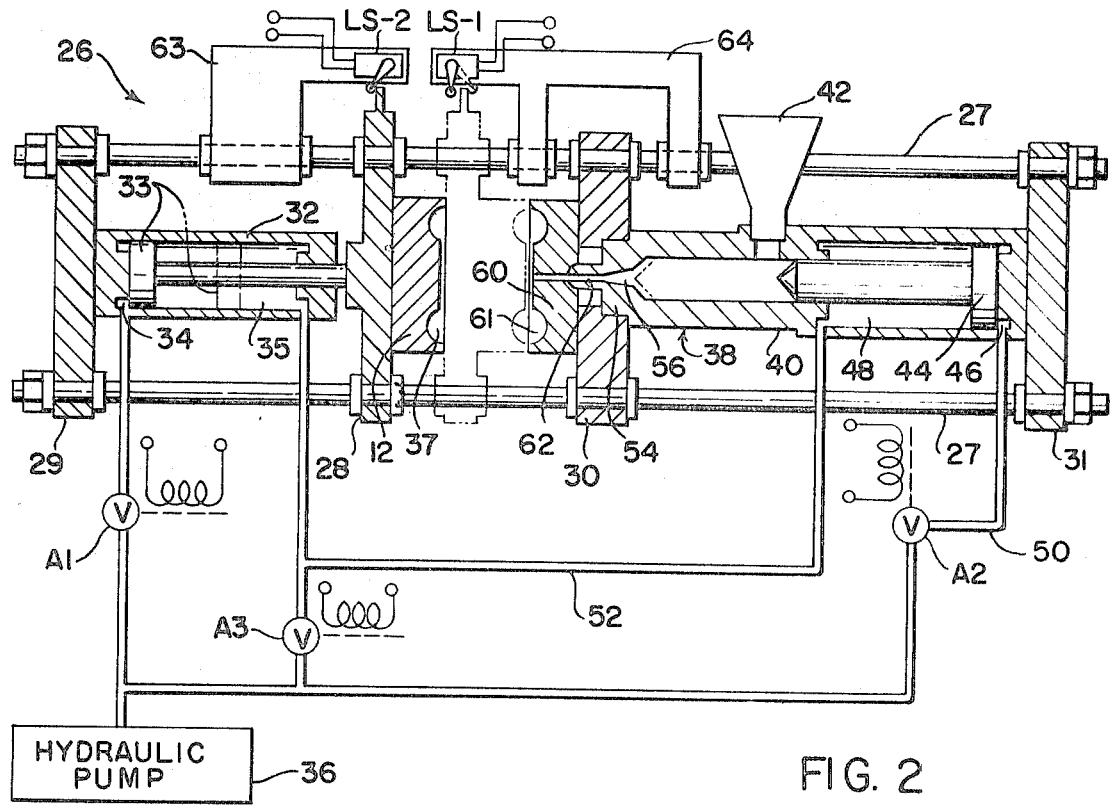
FIG. 2 illustrates a plastic injection molding machine which is preferably controlled by the process control circuit as illustrated in FIG. 1.

Having described control circuit C5, reference is now made to FIG. 2, which basically illustrates an injection molding machine 26. Molding machine 26 is preferably employed with the above-described process control circuit; however, it is to be appreciated that control circuit C5 may be employed with various other machines, for example a lathe or elevator.

As illustrated in FIG. 2, plastic molding machine 26 generally includes a set of tracks 27 having a crosshead member 28 slidably mounted thereon, and three crosshead members 29, 30, and 31 adjustably mounted thereon. A valve assembly 32 is attached to crosshead member 29, and is comprised of an outer chamber 32a having a piston 33 mounted therein to define a first chamber 34 and a second chamber 35. The first and second chambers 34 and 35 are coupled through solenoid controlled valves A1 and A3, respectively, to a hydraulic pump 36. Movable die member 12, having a mold cavity 37 extending into one of the faces thereof, is mounted on crosshead member 18, which is in turn connected to piston 33 of valve assembly 32. Extending between crosshead members 30 and 31 is a plastic injection assembly 38 being generally comprised of a cylinder 40 supported by crosshead members 30 and 31, and having a hopper 42 extending perpendicular to the axis of cylinder 40. Situated within cylinder 40 is a piston 44 which defines a first chamber 46 and a second chamber 48. Chamber 46 is coupled through a tube 50 and control valve A2 to hydraulic pump 36, and chamber 48 is coupled through a tube 52 and control valve A3 to hydraulic pump 36. Cylinder 40 also has an end portion 54 having an injection passage 56 extending therethrough. Supported by crosshead member 30 is a fixed die member 60 having a cavity 61 extending from one face thereof. Fixed die member 60 and crosshead member 30 have an injection passage 62 which is in coaxial alignment with passage 56 of injection assembly 38.

A pair of bracket members 63 and 64 are mounted on frame 27, and have mounted thereon limit switches LS–2 and LS–1, respectively, such that the switches are actuated at the limits of travel of crosshead member 28. Preferably, crosshead members 29, 30 and 31, and bracket members 63 and 64, are adjustably mounted on frame 27 so that the "opened" and "closed" position of movable die member 12 may be adjusted as desired.

TIMER CIRCUIT

References now made to FIG. 3, which more particularly illustrates timer circuit T. Timer circuit T generally includes a timing circuit H connected through a logic circuit L and blocking oscillator circuit O to the control electrodes of a set of triacs 70, 72 and 74.

Blocking oscillator circuit O includes a resistor 76 having one terminal connected to one terminal of timing circuit H and the other terminal connected through a capacitor 78 to ground. Connected between the junction of resistor 76 and capacitor 78 is one terminal of a resistor 80 having the other terminal thereof connected through a capacitor 82 to ground. Also connected to the junction between resistor 76 and capacitor 78 is one terminal of a primary winding 84 of a transformer 86. Connected to the other terminal, or the positive-polarity indicated end, of primary winding 84 is the collector of an NPN transistor 87 having its base connected through a resistor 88 to ground. Also connected to the base of transistor 87 is the cathode of a diode 90 having its anode connected to one terminal of a feed-back winding 92 of transformer 86. The other terminal, or the positive-polarity indicated end, of feed-back winding 92 is connected directly to the junction between resistor 80 and capacitor 82. The emitter of transistor 87 is connected to one terminal of logic circuit L. One terminal of each of a set of secondary windings 94, 96 and 98 of transformer 86 is connected to the control electrodes of triacs 70, 72, and 74, respectively, and the other terminal of each secondary winding is connected directly to a first terminal of triacs 70, 72 and 74, respectively. A set of capacitors 100, 102, and 104, are connected between the first and second terminals of triacs 70, 72, and 74, respectively. Also, the first and second terminals of triacs 70, 72, and 74, provide the output terminals 14 through 19, respectively, of timer circuit T.

Timing circuit H includes an input terminal 11 connected to the anode of a diode 106, having the cathode thereof connected through a capacitor 108 to ground, and through a resistor 110 to one terminal of a potentiometer 112. The other terminal of potentiometer 112 is connected directly to the base of a unijunction transistor 114, and is also connected through a capacitor 116 to ground. The first base of unijunction transistor 114 is connected through a resistor 118 to ground, and the second base of this transistor is connected through a resistor 120 to the junction between resistor 110 and potentiometer 112. Also connected to the first base of unijunction transistor 114 is a control electrode 112 of a silicon controlled rectifier 124. The cathode of silicon controlled rectifier 124 is connected directly to ground, and the anode of this device is connected through a pair of series connected resistors 126 and 128 to the junction between resistor 110 and potentiometer 112.

Connected to the base of unijunction transistor 114 is the anode of a diode 130 having its cathode connected to the anode of a diode 132. The anode of diode 132 is also connected to the junction between resistors 126 and 128, and to the anode of a diode 134.

Logic circuit L includes an input terminal 13 connected to the anode of a diode 136 having the cathode thereof connected through a resistor 138 to the base of an NPN transistor 140, and through a capacitor 139 to ground. The base and emitter of transistor 140 are connected through resistors 142 and 144, respectively, to ground. The collector of transistor 140, is connected through a resistor 146 to the junction between resistor 110 and potentiometer 112. Also connected to the collector of transistor 140 is a resistor 148, having the other terminal thereof connected directly to the base of an NPN transistor 150. The base of transistor 150 is also connected through a resistor 152 to ground, and the emitter of this transistor is connected directly to ground. The collector of transistor 150 is connected to the anode of diode 134.

Also connected to the collector of transistor 140 is the anode of a diode 153 having its cathode connected through a resistor 154 to the base of an NPN transistor 156. The base of transistor 156 is also connected through a resistor 158 to ground, and the emitter of this transistor is connected directly to ground. The collector of transistor 156 is connected through a resistor 160 to the junction between resistor 110 and potentiometer 112. Also connected to the collector of transistor 156 is the anode of a diode 162 having its cathode connected to terminal 164 of a rotary-type switch 166. Terminal 168 of rotary switch 166 is connected to the junction between diode 153 and resistor 154, and to the cathode of diode 132. Terminal 170 of switch 166 is connected directly to the cathode of diode 134. The movable arm 172 of switch 166 is connected through a resistor 174 to the base of an NPN transistor 176, and through a resistor 178 to ground. The emitter of transistor 176 is connected directly to ground, and the collector of this transistor is connected to the emitter of transistor 87.

NORMALLY-CLOSED SWITCHING CIRCUIT

Figure 4:
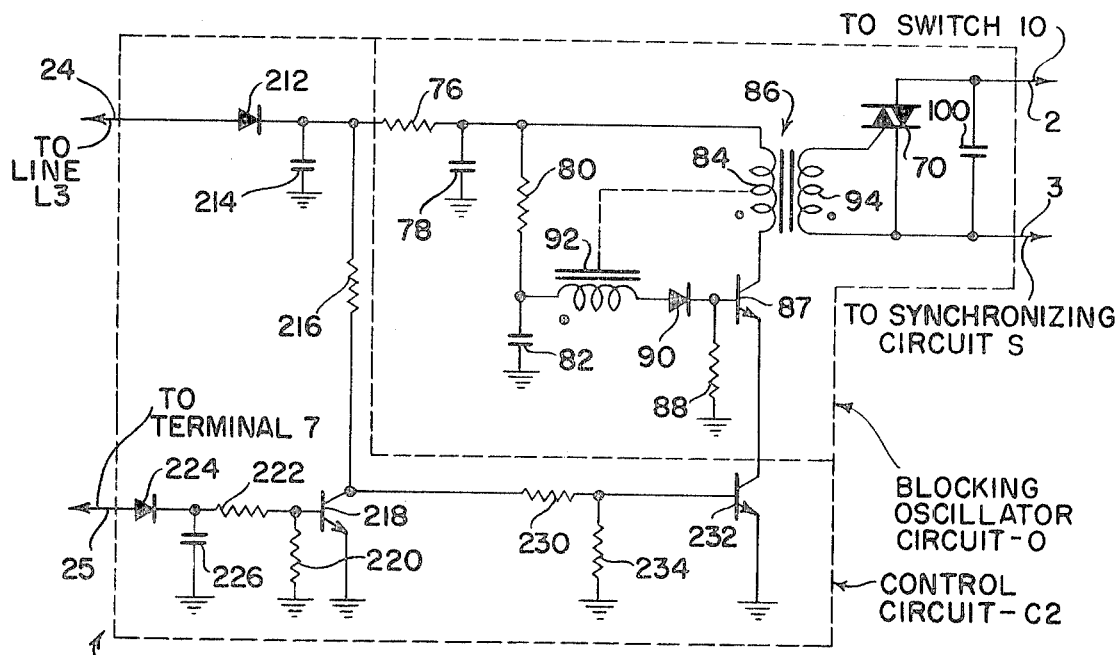

Having now described timer circuit T reference is made to FIG. 4 which illustrates a normally-closed switching circuit N which includes a blocking oscillator circuit O and control circuit C2. Blocking oscillator circuit O is quite similar to the circuit shown in FIG. 3, accordingly, like components in both figures are identified with like character references, and the discussion of that circuit is equally applicable to the blocking oscillator circuit O of switching circuit N. Input terminal 24 of switching circuit N is connected to the anode of the diode 212 having the cathode thereof connected through a capacitor 214 to ground. The junction between diode 212 and capacitor 214 is connected to resistor 76 of blocking oscillator circuit O. The cathode of diode 212 is also connected through a resistor 216 to the collector of an NPN transistor 218. The base of transistor 218 is connected through a bias resistor 220 to ground, and through a resistor 222 to the cathode of a diode 224. The cathode of diode 224 is also connected through a capacitor 226 to ground, and the anode of this diode provides input terminals 25 of switch circuit N.

The collector of transistor 218 is connected through a resistor 230 to the base of an NPN transistor 232, and the emitters of transistors 218 and 232 are connected directly to ground. The base of transistor 232 is also connected through a resistor 234 to ground, and the collector of this transistor is connected to the emitter of transistor 87 of blocking oscillator circuit O. The first and second electrodes of triac 70 provide the output terminals 2 and 3 of switching circuit N.

CONTACTOR CIRCUIT

Figure 5:
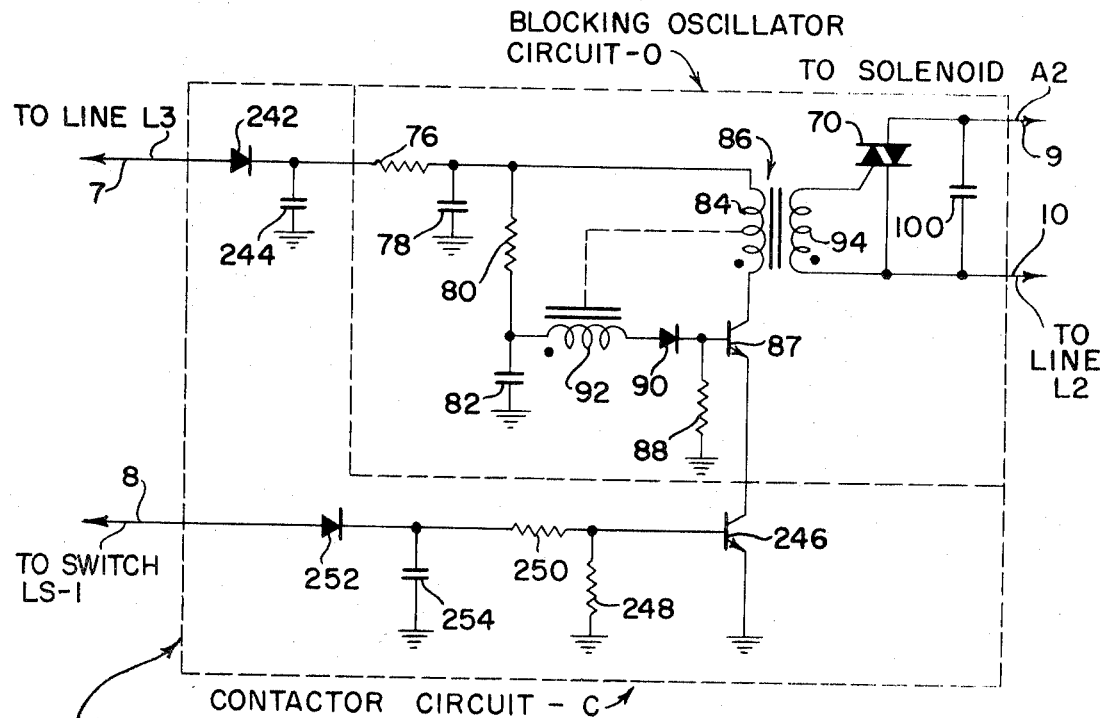

Having now described normally-closed switching circuit N, reference is now made to FIG. 5 which illustrates contactor circuit C, which includes a blocking oscillator circuit O and a control circuit C3. Blocking oscillator circuit O is quite similar to that shown in FIG. 3, accordingly, like components in both figures are identified with like character references and the foregoing discussion is equally applicable to the circuit in FIG. 5.

Control circuit C3 is comprised of an input terminal 7 connected to the anode of a diode 242 having its cathode connected through a capacitor 244 to ground. The junction between the cathode of diode 242 and capacitor 244 is connected to resistor 76 of blocking oscillator circuit O. The emitter of transistor 87 of oscillator circuit O is connected directly to the collector of an NPN transistor 246, having its emitter connected to ground. The base of transistor 246 is connected through a bias resistor 248 to ground, and is also connected through a resistor 250 to the cathode of a diode 252. The cathode of diode 252 is also connected through a capacitor 254 to ground, and the anode of this diode provides the other input terminal 8 of contactor circuit C. The first and second electrodes of triac 70 provide the output terminals 9 and 10 of contactor circuit C.

SYNCHRONIZING CIRCUIT

Figure 6:
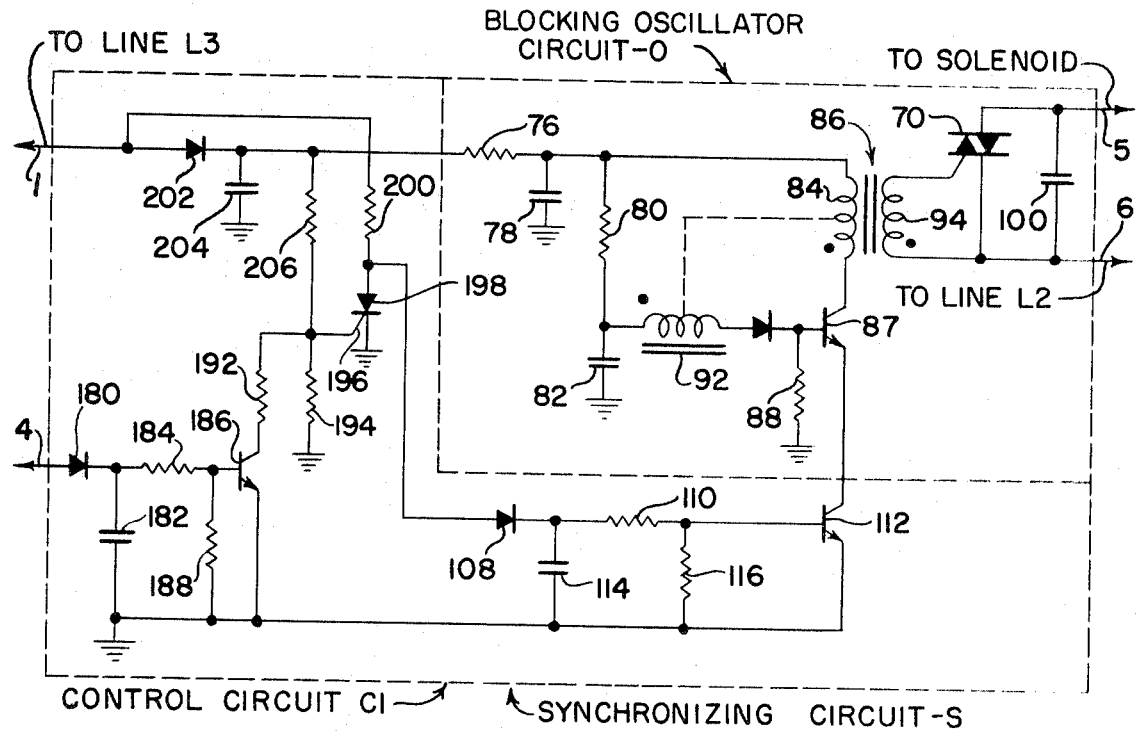

Having now described the contactor circuit C, reference is made to FIG. 6 which illustrates synchronizing circuit S, which includes a blocking oscillating circuit O and a control circuit C1. Blocking oscillating circuit O is quite similar to that shown in FIG. 3, and, accordingly like components in both figures are identified with like character references and the above discussion of the blocking oscillating circuit of FIG. 3 is applicable to that circuit in FIG. 6.

Control circuit C1 includes an input terminal 4 connected to the anode of a diode 180 having the cathode thereof connected through a capacitor 182 to ground, and also connected through a resistor 184 to the base of an NPN transistor 186. The base of transistor 186 is also connected through a resistor 188 to ground, and the emitter of this transistor is connected directly to ground.

The collector of transistor 186 is connected through a pair of series-connected resistors 192 and 194 to ground, and the junction between these resistors is connected to the control terminal 196 of a silicon controlled rectifier 198. The anode of silicon controlled rectifier 198 is connected through a resistor 200 to the other input terminal 1 of synchronizing circuit S, and the cathode of controlled rectifier 198 is connected directly to ground. The other input terminal of synchronizing circuit S is connected to the anode of a diode 202, having its cathode connected through a capacitor 204 to ground. Connected to the cathode of diode 202 is one terminal of a resistor 206, and the other terminal thereof is coupled to the control electrode 196 of silicon controlled rectifier 198. The cathode of diode 202 also provides an output terminal for control circuit C1 which is connected to resistor 76 of blocking oscillator circuit O.

The anode of silicon controlled rectifier 198 is coupled through a series-connected diode 108, poled as shown in FIG. 6, and resistor 110, to the base of an NPN transistor 112. Connected between the junction of diode 108 and resistor 110 is one terminal of a capacitor 114, and the other terminal thereof is connected directly to ground. The base of transistor 112 is also connected through a resistor 116 to ground, and the emitter of this transistor is connected directly to ground. The collector of transistor 112 provides the other output terminal of control circuit C1 and is coupled directly to the emitter of transistor 87. Output terminals 5 and 6 of synchronizing circuit S are connected to the first and second electrodes of triac 70.

Preferably, the second synchronizing circuit S is similar to the first synchronizing circuit S, therefore, the above-description is equally applicable to both circuits.

GENERAL OPERATION

Upon closure of normally-open switch B, the first synchronizing circuit S is coupled across supply source S1 through normally-closed switching circuit N. When the alternating-voltage signal applied to synchronizing circuit S passes through approximately a zero potential, to the output terminals of synchronizing circuit S take the form of a closed circuit to couple supply source S1 directly across solenoid controlled valve A1. Upon energization of control valve A1, hydraulic pump 36 is coupled to the first chamber 34 of valve assembly 32 to thereby drive movable die member 12 from the open position to a closed position.

When movable die member 12 reaches the closed position, normally-open limit switch LS–1 is closed to thereby energize contactor circuit C and commence timing by timer circuit T. Upon energization of contactor circuit T, solenoid controlled valve A2 will be connected directly across supply source S1 thereby causing valve A2 to open. When valve A2 opens, hydraulic pump 36 is coupled through tube 50 to the first chamber 46 of injection assembly 38 to thereby cause piston 44 to move to the left. As piston 44 commences to move to the left, plastic material fed into hopper 42 will be injected into mold cavities 37 and 61.

Upon time-out of timer circuit T, each of the three pair of output terminals 14–15, 16–17, and 18–19, take the form of a closed circuit to thereby cause timer circuit T to remain energized, and energize the second synchronizing circuit S and normally-closed switching circuit N. As may be readily apparent, potentiometer 112 of timer circuit T may be adjusted such that the timing period is sufficient to allow the injected thermoplastic to solidify. The closed circuit between output terminals 14 and 15 of timer circuit B provide a holding circuit for maintaining timer circuit T in an energized condition after limit switch LS–1 opens, i.e., when movable die member 12 is withdrawn from the closed position. The closed circuit between output terminals 18 and 19 of timer circuit T energizes normally-closed switching circuit N to thereby de-energize the first synchronizing circuit S. When synchronizing circuit S is de-energized, solenoid controlled valve A1 is in turn de-energized. The closed circuit between output terminals 16 and 17 of timer circuit T couple supply source S1 across the second synchronizing circuit S to thereby cause solenoid controlled valve A3 to become actuated at a time when the alternating-voltage signal supplied by source S1 reaches approximately a zero potential. Upon actuation of control valve A3, hydraulic pump 36 is coupled to chambers 35 and 48 thereby causing die member 12 and piston 44 to be withdrawn to the initial or open position. When die member 12 contacts limit switch LS–2, timer circuit T is de-energized thereby opening the output terminals 14 through 19 of timer circuit T.

When output terminals 16 and 17 of timer circuit T take the form of an open circuit, the second synchronizing circuit S will become de-energized thereby de-energizing solenoid controlled valve A3, thereby terminating further travel of movable die member 12. When output terminals 18 and 19 of timer circuit T take the form of an open circuit, normally closed switching circuit N becomes de-energized thereby providing a closed circuit between output terminals 2 and 3 of switching circuit N. Thus, the control system is then ready for another cycle of operation upon closure of normally open switch B.

OPERATION OF TIMER CIRCUIT

The signal supplied by alternating-voltage supply source S1 is rectified through the network comprised of diode 106, capacitor 108, resistors 110 and 76, and capacitor 78, to thereby provide a direct-current signal which will charge capacitor 82 through resistor 80, and will also cause transformer 86 to begin to store energy in primary winding 84. As energy is gradually stored in primary winding 84, a positive voltage of increasing amplitude is induced in feed-back winding 92 of the polarity indicated with reference to the polarity dot. The voltage induced in feed-back winding 92 is applied through diode 90 to gradually forward bias transistor 87 into conduction. Once transistor 87 commences to conduct, capacitor 82 rapidly discharges through primary winding 84 and transistors 87 and 176 to ground, assuming transistor 176 is forward biased into conduction.

When capacitor 82 discharges through primary winding 84, a voltage impulse of short duration is developed across primary winding 84 which in turn induces a similar pulse in secondary windings 94, 96, and 98, to thereby apply a short duration gating signal to the control electrodes of triacs 70, 72, and 74, respectively. These gating signals causes the triacs to switch from an "off" to an "on" condition. In the "on" condition, a closed path is completed between output terminals 14–15, 16–17, and 18–19, which path will be maintained until the signal developed by voltage supply source S1 passes through approximately a zero-voltage level. Because the gating pulse is of a very short duration, excessive current is not applied to the control electrodes of triacs 70, 72, and 74, and operation at high temperatures is made possible.

Also, upon saturation of the core of transformer 86, the induced current through feed-back winding 92 terminates, and the forward biasing signal applied to transistor 87 terminates, to thereby cause this transistor to again become reverse biased. Once transistor 87 becomes reverse biased, capacitor 82 will again begin to charge to thereby commence another cycle of operation.

When transistor 176 is reverse biased, the oscillator circuit including transistor 87 will cease to oscilate since there will be no path for the discharge of capacitor 82. Transistor 176 is actuated by the signal supplied from timing circuit H and logic circuit L.

Prior to the closure of normally-open limit switch LS–1 transistor 140 is reverse biased to thereby cause transistors 150 and 156 to become forward biased. When transistor 150 is forward biased, capacitor 116 will discharge and remain in a discharged condition through diode 130 and transistor 150. Since transistor 140 is reverse biased, and transistor 150 is forward biased, a binary "1" signal will appear at terminal 168, and a binary "0" signal will appear at terminal 164, respectively, of switch 166. By a binary "0" signal is meant a signal equal to approixmately ground potential, and by a binary "1" signal is meant a signal of some positive potential. Since the anode of diode 153 is effectively grounded through transistor 150, the signal appearing at the cathode of diode 153, i.e., terminal 170 of switch 166 will be a binary "0" signal.

Upon closure of normally-open switch LS–1, the direct-current signal developed by diode 136 and capacitor 139 is applied to the base of transistor 140 to forward bias this transistor into conduction, thereby commencing a timing cycle. When transistor 140 becomes forward biased, transistor 150 will become reverse biased to thereby allow capacitor 116 to commence charging through potentiometer 112. As may be readily apparent, the impedance of potentiometer 112 may be varied to alter the resistor-capacitor timing cycle of operation. During the timing operation, transistor 156 will remain in a conductive state since a binary "1" signal is applied to the base thereof through resistor 128, diode 132, and resistor 154. Since transistor 156 remains in a conductive condition, the signal appearing at terminal 164 of switch 166 will remain at a binary "0" signal level. When transistor 150 becomes reverse biased, a binary "1" signal will appear at the anode of diode 132 to thereby apply a binary "1" signal to terminal 168 of switch 166. Similarly, a binary "1" signal will appear at the anode of diode 134 to thereby cause the signal at terminal 170 of switch 166 to change from a binary "0" signal to a binary "1" signal.

When the voltage developed across capacitor 116 attains a level sufficient to cause unijunction transistor 114 to fire or "avalanche," a voltage will be developed across resistor 118 to thereby gate silicon controlled rectifier 124 into conduction. When silicon controlled rectifier 124 becomes conductive, a binary "0" signal will be applied to the anode of diodes 132 and 134. Since transistor 140 remains in a conductive state after the completion of a timing cycle, a binary "0" signal will be applied to the anode of diode 152. With a binary "0" signal applied to the anodes of diodes 132, 134, and 152, a binary "0" signal will appear at terminals 168 and 170 of switch 166. Transistor 156 will be reverses biased and a binary "1" signal will appear at terminal 164 of switch 166.

When a binary "0" signal appears at terminal 164 of switch 166, assuming movable arm 172 is in the position as illustrated in the FIG. 3, a binary "0" signal will be applied to the base of transistor 176 thereby reverse biasing this transistor. If a binary "1" signal appears at terminal 164 of switch 166, transistor 176 will be forward biased into conduction, thereby commencing oscillation of blocking oscillator circuit O.

OPERATION OF NORMALLY-CLOSED SWITCHING CIRCUIT

Prior to applying an alternating current signal to input terminal 25 of normally closed switching circuit N, transistor 218 will be reverse biased to thereby apply a binary "1" signal to the base of transistor 232. When a binary "1" signal is applied to the base of transistor 232, this transistor will become forward biased thereby causing blocking oscillator circuit O to commence oscillating. When oscillator circuit O commences to oscillate, the circuit between output terminals 2 and 3 takes the form of a closed circuit.

Upon application of an alternating current signal to terminal 25 of switching circuit N, i.e., upon closure of output terminals 18 and 19 of timer circuit T, the alternating voltage signal supplied by source S1 is rectified through diode 224 and capacitor 226 to apply a binary "1" signal to the base of transistor 218. When a binary "1" signal is applied to the base of transistor 218, this transistor becomes conductive to thereby apply a binary "0" signal to the base of transistor 232. When a binary "0" signal is applied to the base of transistor 232, this transistor becomes reverse biased to thereby cause blocking oscillator circuit O to cease oscillating. When oscillator circuit O ceases to oscillate, the circuit between output terminals 2 and 3 takes the form of an open circuit.

OPERATION OF CONTACTOR CIRCUIT

Prior to the application of an alternating-current signal to input terminal 8 of contactor circuit C, i.e., prior to closure of limit switch LS–1, transistor 246 is reverse biased thereby preventing oscillator O from oscillating. In this condition, the circuit between terminals 9 and 10 of contactor circuit C takes the form of an open circuit. Upon application of an alternating-voltage signal to input terminal 8 of contactor circuit C, i.e., after closure of limit switch LS–1, transistor 246 will become forward biased to thereby cause oscillator circuit O to commence oscillation; and the circuit between output terminals 9 and 10 takes the form of a closed circuit.

OPERATION OF SYNCHRONIZING CIRCUIT

Prior to the application of an alternating-current signal to the input terminal 4 of synchronizing circuit S, transistor 186 is reverse biased to thereby cause a binary "1" signal to be applied to the control electrode 196, or gate, of silicon controlled rectifier 198. When the binary "1" signal is applied to the control electrode of silicon controlled rectifier 198, the silicon controlled rectifier will present a low impedance to the flow of current supplied by alternating-voltage source S1 during the positive portion of each cycle. Because of the low impedance exhibited by silicon controlled rectifier 198 with respect to a positive polarity signal, a binary "0" signal will be applied through diode 108 to the base of transistor 112. Diode 108 will effectively prevent the negative polarity portion of the signal developed by the source S1 from being applied to the base of transistor 112. When a binary "0" signal is applied to the base of transistor 112, the transistor will become reverse biased to thereby prevent blocking oscillator circuit O from oscillating.

Upon application of an alternating-current signal to the input terminal 4 of synchronizing circuit S, the alternating voltage signal is rectified through diode 180 and capacitor 182 to apply a binary "1" signal to the base of transistor 186 thereby forward biasing this transistor into conduction. When transistor 186 becomes conductive, a binary "0" signal will be applied to the control electrode 196 of silicon controlled rectifier 198. After removal of the signal applied to control electrode 196, silicon controlled rectifier 198 continues to exhibit a low impedance to the positive polarity current flow until the voltage applied to the anode becomes slightly negative with respect to the cathode. Thus, as the signal developed by source S1 becomes slightly negative, silicon controlled rectifier 198 exhibits a high impedance to the flow of current. When the signal developed by source S1 again becomes slightly positive, a binary "1" signal will be applied through diode 108 to forward bias transistor 112 into conduction. As may be readily apparent, transistor 112 will be forward biased into conduction on the leading edge of the positive polarity portion of the alternating-voltage signal developed by source S1. By varying the bias signal applied to transistor 112, i.e., by altering the value of resistor 116, the positive voltage level at which transistor 112 is forward biased may be varied from approxiamtely zero potential to approximately the maximum positive polarity signal developed by supply source S1. In order to actuate triac 70 into conduction at a point in time when the alternating voltage signal applied to the terminals is approximately a zero voltage level, it is necessary to bias transistor 112 such that the transistor becomes conductive when the signal developed by source S1 becomes slightly positive. Alternatively, the bias signal applied to transistor 186 could be varied by altering the impedance of resistor 188 to obtain substantially similar results.

FUNCTIONAL MODULES

Having now described the process control circuitry, references now made to FIGS. 7 and 8 which illustrate the functional module approach to process control circuitry. A solid-state functional circuit, such as those illustrated in FIGS. 3 through 6, is constructed on a printed circuit board 272, and the board is mounted on a connector block 274. Connector block 274 includes a set of mounting screws 276 for mounting the assembly in a rack 278, indicator lamps 280 which provide an indication when the circuit is energized, and screw terminals 282 for connecting the circuit into the overall process control system. If a timer circuit such as that illustrated in FIG. 3 were associated with a terminal block 274, electromechanical indicia would be included on the face of terminal block 274 representative of the logic function performed by the associated solid state circuit. For example, the electromechanical indicia on the face of terminal block 274 is an electromechanical representation of the solid-state timer circuit and associated logic circuit as shown in FIG. 3. Thus, the normally-open relay contacts 284 extending between terminals L3-8, 9-10, and 11-12 of terminal block 274 are electromechanical equivalents corresponding to terminals 14-15, 16-17, and 18-19, of timer circuit T. Similarily the standard electromechanical relay symbology 286 associated with terminals 3, 4, 5, and 6 of terminal block 274 illustrate the electromechanical symbology representative of the solid-state logic circuitry in timer circuit T. As is readily apparent, one familiar with electromechanical circuits and symbology could apply a solid-state timer circuit including logic circuitry, such as that illustrated in FIG. 3, to a process control system without previous training in solid-state logic circuitry.

Various combinations of functional modules such as shown in FIG. 7 may be combined and mounted in a rack 288 to provide the desired process control functions. For example, if a process control system such as that illustrated in FIG. 1 were desired, five functional modules would be required, to wit, two synchronizing circuit modules, a contactor circuit module, a timer circuit module, and a normally-closed switching circuit as is illustrated in FIG. 8. The particular combination of functional modules would be dependent on the functions required for the process control system.

Although the invention has been shown in connection with a preferred embodiment, it will be readily apparent to those skilled in the art that various changes in form and arrangement of parts may be made to suit requirements without departing from the spirit and scope of the invention as defined by the appended claims.

We claim:

1. In a plastic injection apparatus for molding articles of thermoplastic material of the type having a frame;
   a first and second crosshead member mounted for sliding movement on said frame;
   injection means mounted on said first crosshead member intermediate said first crosshead member and said second crosshead member, for upon actuation, injecting plastic material; said injection means comprised of a cylinder having an end member with a passage extending therethrough;
   a first die part mounted for sliding movement on said frame;
   a second die part fixed to said second crosshead member, said second crosshead member and said second die part having a passage extending therethrough, said die passage being coaxial with said injection passage;
   hydraulic actuation means for driving said first die part from an open position to a closed position;
   actuable switch means adapted to be connected to a voltage supply source for developing an output signal in dependence upon the position of said first die part, the improvement comprising:
   a control circuit including an input circuit means coupled to said actuatable switch means and an output circuit means for carrying an output alternating-current signal,
      solid-state alternating current to direct current converter means coupled to said input circuit means for providing a direct current output signal in response to a said output signal developed by said switching means;
      solid-state direct-current logic means coupled to said converter means for performing an electrical function and providing a direct-current output signal; and,
      solid-state direct current to alternating current converter means coupled to said logic means for providing a said alternating-current output signal from said direct current output signal of said logic means;
      said output circuit means of said control circuit adapted to be coupled to a said injection means to thereby energize a said injection means in dependence upon the function performed by said solid-state direct-current logic means.

2. In an injection apparatus as defined in claim 1 including a second actuatable switch means adapted to be coupled to a said voltage supply source for providing a second output signal upon actuation of said second switch means;
   a second control circuit including an input circuit means coupled to said second actuatable switch means and an output circuit for carrying a second output alternating current signal,
      second solid-state alternating current to direct current converter means coupled to said input circuit of said second control circuit for providing a direct current output signal from a said second output signal;
      second solid-state direct-current logic means coupled to said second converter means for performing an electrical function and providing a direct current output signal;

second solid-state direct-current to alternating current converter means coupled to said second logic means for providing a said second output alternating current signal from said direct current output signal of said second logic means; and, said output circuit of said second control circuit adapted to be coupled to said hydraulic actuation means to thereby energize said hydraulic means in dependence upon the function performed by said solid-state direct current logic means of said second control circuit.

3. In an injection apparatus as defined in claim 1 wherein said solid-state direct current to alternating current converter means includes an electronic control means having a first, second, and control electrode, and exhibiting the characteristic of presenting a low impedance to a said output alternating current signal to said injection means when a forward biasing signal is applied to said control electrode; said first and second electrodes of said electronic control means adapted to be coupled to said injection means, and said control electrode coupled to said solid-state means.

4. In an injection apparatus as defined in claim 3 wherein said electronic control means is a triac.

5. In an injection apparatus as defined in claim 3 wherein said solid-state direct current to alternating current converter means includes a first and second actuatable switching means coupled to a source supply, for, when both are actuated, applying a said forward biasing signal to said control electrode of said electronic control means, and said second actuatable switching means having a control electrode coupled to said solid-state logic means so that said actuatable switching means is actuated in dependence upon the function performed by said logic means.

6. In an injection apparatus as defined in claim 5 wherein said solid-state logic means includes a timing means for actuating said second actuatable switching means at a predetermined time after a said direct current output signal developed by said alternating current to direct current converter means is applied to said solid-state logic means.

7. In a plastic molding machine a control circuit for energizing an actuatable means including:

a solid-state input circuit means for receiving an input signal and an output circuit means for carrying an output alternating current signal;

solid-state logic means coupled to said input circuit means for performing an electrical function in response to the receipt of a said input signal and providing an output signal; and, solid-state direct current to alternating current converter means coupled to said logic means for providing a said alternating current output signal from said output signal of said logic means; said output circuit means of said control circuit adapted to be coupled to a said actuatable means to thereby energize said actuatable means in dependence upon the function performed by said solid-state logic means.

8. In a plastic molding machine of the type having hydraulic actuation means for controlling a machine operation, a control circuit for energizing said actuation means including:

an input circuit means for receiving an input signal and an output circuit means for carrying an output alternating current signal;

solid-state logic means coupled to said input circuit means for performing an electrical function and providing a direct current output signal; and, solid-state direct current to alternating current converter means coupled to said logic means for providing a said alternating current output signal from said direct current output signal of said logic means; said output circuit means of said control circuit adapted to be coupled to a said hydraulic actuation means to thereby energize a said actuation means in dependence upon the function performed by said solid-state direct-current logic means.

9. In a plastic molding machine as defined in claim 8 wherein said input circuit means includes solid-state converter circuit means for receiving an alternating current input signal and providing a direct-current output control signal; and said solid-state logic means includes circuit means for receiving a said control signal and for performing a said electrical function in response to the receipt of a said control signal.

10. In a plastic molding machine as defined in claim 9 wherein said solid-state logic circuit means includes a timing means for actuating said second actuatable switching means at a predetermined time after a said output control signal developed by said converter circuit means is applied to said solid-state logic means.

11. In a plastic molding machine as defined in claim 10 wherein said solid-state direct current to alternating current converter means includes an electronic control means having a first, second, and control electrode, and exhibiting the characteristic of presenting a low impedance to a said output alternating current output signal when a forward biasing signal is applied to said control electrode; said first and second electrodes of said electronic control means adapted to be coupled to said actuation means, and said control electrode being coupled to said solid-state logic means.

12. In a plastic molding machine as defined in claim 11 wherein said converter means is a triac.

13. A process control system for positioning a movable machine member, comprising:

circuit means responsive to the position of a said movable machine member for providing an output signal in dependence upon the position of said machine member;

solid-state direct-current logic means coupled to said circuit means for performing an electrical function and providing a direct-current output signal;

solid-state direct-current to alternating current converter means for providing an alternating current output signal from said direct current output signal;

actuatable means coupled to said converter means, for upon energization by a said alternating current output signal, driving a said movable machine member so that the position of a said machine member is dependent upon the function performed by said static direct-current logic means.

14. A process control system including a plurality of functional modules for sequencing a plurality of machine operations wherein at least one said machine operations is the positioning of a movable machine member, comprising:

actuatable means, for upon energization, driving a said movable machine member;

a control circuit including an input circuit means for receiving input alternating current signals and an output circuit means for carrying output alternating current signals, static direct-current logic means for performing an electrical function and providing a direct current output signal, and static direct current for alternating current converter means coupled to said logic means for providing a said alternating current output signal from said direct current output signal;

said output circuit means of said control circuit coupled to said actuatable means so that said actuatable means is energized in dependence upon the function performed by said static direct-current logic means.

15. A process control system as defined in claim 14 wherein said direct current to alternating current converter means includes an electronic control means having a first, second, and control electrode, and exhibiting the characteristic of presenting a low impedance to the flow of a said output alternating current signal to said actuatable means when a forward biasing signal is applied to said control electrode, said first and second electrodes of said electronic control means coupled to said actuatable means; and, second circuit means coupling said control electrode of said electronic control means to said static direct current logic means.

References Cited

UNITED STATES PATENTS

| 3,184,788 | 5/1965 | Serrano | 18—2 I |
|---|---|---|---|
| 3,254,371 | 6/1966 | Rees | 18—30 CK |
| 3,459,851 | 8/1969 | MacPherson | 18—13 C |

H. A. KILBY, JR., Primary Examiner

U.S. Cl. X.R.

18—13, 16, 30